United States Patent
Chang et al.

(10) Patent No.: US 11,112,322 B2
(45) Date of Patent: Sep. 7, 2021

(54) BICYCLE AND SPIDER CAPABLE OF MEASURING POWER

(71) Applicant: Giant Manufacturing Co. Ltd., Taichung (TW)

(72) Inventors: Chih-Kai Chang, Taichung (TW); Ching-Yao Lin, Taichung (TW)

(73) Assignee: GIANT MANUFACTURING CO. LTD., Taichung (TW)

( * ) Notice: Subject to any disclaimer, the term of this patent is extended or adjusted under 35 U.S.C. 154(b) by 171 days.

(21) Appl. No.: 16/542,404

(22) Filed: Aug. 16, 2019

(65) Prior Publication Data
US 2021/0048360 A1  Feb. 18, 2021

(51) Int. Cl.
| | | |
|---|---|---|
| *G01L 5/00* | (2006.01) | |
| *B62M 3/16* | (2006.01) | |
| *G01L 3/10* | (2006.01) | |
| *B62J 99/00* | (2020.01) | |
| *F16H 55/30* | (2006.01) | |
| *B62J 45/40* | (2020.01) | |

(52) U.S. Cl.
CPC .............. *G01L 5/0095* (2013.01); *B62J 99/00* (2013.01); *B62M 3/16* (2013.01); *G01L 3/108* (2013.01); *B62J 45/40* (2020.02); *F16H 55/30* (2013.01)

(58) Field of Classification Search
CPC ........ G01L 5/0095; G01L 3/108; B62J 99/00; B62J 45/40; B62M 3/16; F16H 55/30
See application file for complete search history.

(56) References Cited

U.S. PATENT DOCUMENTS

| | | | |
|---|---|---|---|
| 8,065,926 B2 * | 11/2011 | Meyer | G01L 3/1471 73/862.338 |
| 8,505,393 B2 | 8/2013 | Meyer | |
| 8,844,377 B2 | 9/2014 | Yap | |
| 9,784,628 B1 | 10/2017 | Jennings et al. | |
| 2005/0178210 A1 | 8/2005 | Lanham | |
| 2007/0049437 A1 * | 3/2007 | Wickliffe | B62M 9/10 474/152 |
| 2014/0001728 A1 * | 1/2014 | Hilfiker | G01L 5/165 280/259 |
| 2015/0093593 A1 | 4/2015 | Asakawa | |
| 2018/0354585 A1 * | 12/2018 | Chen | B62M 3/06 |
| 2021/0046992 A1 * | 2/2021 | Chang | B62J 45/411 |

OTHER PUBLICATIONS

Extended European Search Report for European Application No. 20189551.3, dated Jan. 19, 2021.

* cited by examiner

*Primary Examiner* — Max H Noori
*Assistant Examiner* — Masoud H Noori
(74) *Attorney, Agent, or Firm* — Birch, Stewart, Kolasch & Birch, LLP

(57) ABSTRACT

A bicycle has a spider including a torque input section and at least one torque output section; a crank assembly coupled with the spider through the torque input section and applying an input torque to the spider; a chainring mounted to the spider through the at least one torque output section and receiving an output torque from the spider; a gauge disposed and oriented generally along a tangential direction or a quasi-tangential direction with respect to the torque input section and the at least one torque output section; and a circuitry coupled to the gauge and receiving a signal from the gauge.

18 Claims, 8 Drawing Sheets

BICYCLE AND SPIDER CAPABLE OF MEASURING POWER

BACKGROUND OF THE INVENTION

1. Field of the Invention

This invention relates to a bicycle capable of measuring power, and, more particularly, to a spider of the bicycle capable of measuring power transmitted through the spider.

2. Description of Related Art

Riding a bicycle is an activity that a cyclist applies force on pedals exceeding the opposing force of friction from the bicycle tires and the air resistance or other force (such as gravity, inertia, and etc.) and drives the bicycle moving forward. Work done by the cyclist causes the crankset to rotate, and the energy is transferred through the crankset to the kinetic energy of the bicycle via the chain. For training and racing purpose, it is important to measure or monitor the pedaling force or power during cycling so as to track and adjust cyclist's pedaling cadence instantly or modify a succeeding training program.

A bicycle with strain gauges is commercially provided to measure the power generated from the cyclist by ways of measuring the deformation strain applying on various components. Generally, the strain gauges are placed in/on one or both pedals, one or both crank arms, an axle in the bottom bracket, or a spider of the crankset where the force transmitted through the at least one components mentioned above can be measured. For example, U.S. Pat. No. 8,505,393, titled "Crankset Based Bicycle Power Measurement," employs a pair of strain gauges placed on the spider and arranged at opposing 45 degree angles on a single gauge substrate (see FIGS. 2 and 4) to measure shear strain occurred on the spider. In addition, U.S. Pat. No. 8,117,923, titled "Bicycle Bottom Bracket Force Sensor," employs two pairs of strain gauges placed on the bottom bracket and each pair of strain gauges are arranged in a X-shape (see FIGS. 7, 9 and 16) to measure shear strain occurred on the bottom bracket. However, the existing strain gauge measuring techniques are not straightforward and may be affected by other non-effective so that the measurement has less precision and accuracy. In some cases, bicycle's component to which strain gauges are attached needs to be reshaped or even weaken part of the structure for magnifying the applied strain and thus getting a better measurement result. Accordingly, the structure strength or integrity of the reshaped part is quite reduced further. Therefore, other improvements for bicycle power measurements are sufficient required.

SUMMARY OF THE INVENTION

It is therefore an object of the present invention to provide a bicycle or a spider capable of simply, precisely and accurately measuring power generated from a cyclist.

In one aspect of the present invention, the bicycle comprises a spider including a torque input section and at least one torque output section; a crank assembly coupled with the spider through the torque input section and applying an input torque to the spider; a chainring mounted to the spider through the at least one torque output section and receiving an output torque from the spider; a gauge disposed and oriented generally along a tangential direction or a quasi-tangential direction with respect to the torque input section and the at least one torque output section; and a circuitry coupled to the gauge and receiving a signal from the gauge.

In another aspect of the present invention, the tangential direction is defined as a direction along an external common tangent or an internal common tangent to the torque input section and the at least one torque output section, and the quasi-tangential direction is defined as a direction along a line whose slope is between slopes of the external common tangent and the internal common tangent.

In yet another aspect of the present invention, the tangential direction is defined as a direction along an external common tangent and an internal common tangent to a circle with a radius of 10 to 100, preferably 30 to 45, millimeters from a center of the torque input section and a circle with a radius of 4 to 6, preferably 5, millimeters from a center of the at least one torque output section, and the quasi-tangential direction is defined as a direction along a line whose slope is between slopes of the external common tangent and the internal common tangent.

In yet another aspect of the present invention, the spider has at least one arm portion and a central portion, and the torque input section is located at the central portion and the at least one torque output section is located at the at least one arm portion, and wherein the at least one arm portion is asymmetric with respect to a line from a center of the torque input section to a center of the at least one torque output section.

In yet another aspect of the present invention, the spider has at least one arm portion and a central portion, and the at least one arm portion does not radially extend from the central portion.

In yet another embodiment of the present invention, the at least one arm portion is clockwise or counterclockwise obliquely extending from the central portion.

In yet another aspect of the present invention, an external common tangent to the torque input section and the at least one torque output section forms an angle with a line from a center of the torque input section to a center of the at least one torque output section and the angle ranges from 3 to 75, preferably 30 to 45, degrees.

In yet another aspect of the present invention, the gauge is attached on a flat surface of the spider, and a normal line of the flat surface forms an angle with a plane of the chainring and the angle ranges from 0 to 180 degrees.

In yet another aspect of the present invention, the flat surface of the spider is formed on a convex or concave of the spider and aligned with the tangential direction or the quasi-tangential direction.

In yet another aspect of the present invention, pure tensile or compressive stress occurs on where the gauge is disposed.

In one aspect of the present invention, the spider comprises a central portion including a torque input section; at least one arm portion including at least one torque output section and outward extending from the central portion; and a gauge, disposed and oriented generally along a tangential direction or a quasi-tangential direction with respect to the torque input section and the at least one torque output section and generating a signal in response to torque transmission from the torque input section to the at least one torque output section.

In another aspect of the present invention, the tangential direction is defined as a direction along an external common tangent or an internal common tangent to the torque input section and the at least one torque output section, and the quasi-tangential direction is defined as a direction along a line whose slope is between slopes of the external common tangent and the internal common tangent.

In yet another aspect of the present invention, the tangential direction is defined as a direction along an external common tangent and an internal common tangent to a circle with a radius of 10 to 100, preferably 30 to 45, millimeters from a center of the torque input section and a circle with a radius of 4 to 6, preferably 5, millimeters from a center of the at least one torque output section, and the quasi-tangential direction is defined as a direction along a line whose slope is between slopes of the external common tangent and the internal common tangent.

In yet another aspect of the present invention, the at least one arm portion is asymmetric with respect to a line from a center of the torque input section to a center of the at least one torque output section.

In yet another aspect of the present invention, the at least one arm portion does not radially extend from the central portion.

In yet another embodiment of the present invention, the at least one arm portion is clockwise or counterclockwise obliquely extending from the central portion.

In yet another aspect of the present invention, an external common tangent to the torque input section and the at least one torque output section forms an angle with a line from a center of the torque input section to a center of the at least one torque output section and the angle ranges from 3 to 75, preferably 30 to 45, degrees.

In yet another aspect of the present invention, the gauge is attached on a flat surface of the spider, and a normal line of the flat surface forms an angle with a main plane of the spider and the angle ranges from 0 to 180 degrees.

In yet another aspect of the present invention, the flat surface of the spider is formed on a convex or concave of the spider and aligned with the tangential direction or the quasi-tangential direction.

In yet another aspect of the present invention, pure tensile or compressive stress occurs on where the gauge is disposed.

These and other features and advantages of the present invention can be more readily understood from the following preferred embodiments of the present invention with reference to the appended drawings.

BRIEF DESCRIPTION OF THE DRAWINGS

In order to sufficiently understand the essence, advantages and the preferred embodiments of the present invention, the following detailed description will be more clearly understood by referring to the accompanying drawings.

DETAILED DESCRIPTION OF THE DRAWINGS

The following description shows the preferred embodiments of the present invention. The present invention is described below by referring to the embodiments and the figures. Thus, the present invention is not intended to be limited to the embodiments shown, but is to be accorded the principles disclosed herein. Furthermore, that various modifications or changes in light thereof will be suggested to a person having ordinary skill in the art and are to be included within the spirit and purview of this application and scope of the appended claims.

Figure 1:
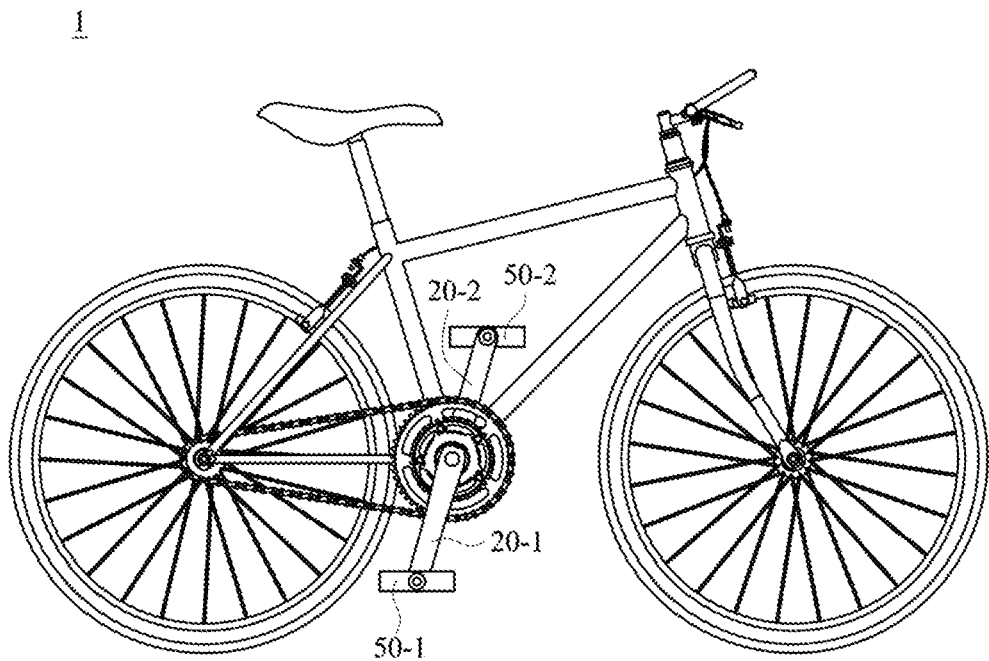
FIG. 1 depicts a bicycle capable of measuring power generated from a cyclist in accordance with one embodiment of the present invention.
Figure 2:
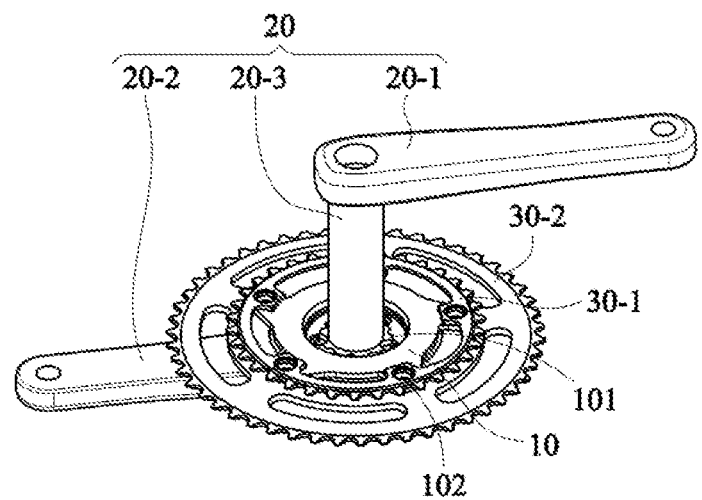
FIG. 2 depicts a view of the assembly particularly including a spider partially enlarged from the bicycle of FIG. 1.
Figure 3A:
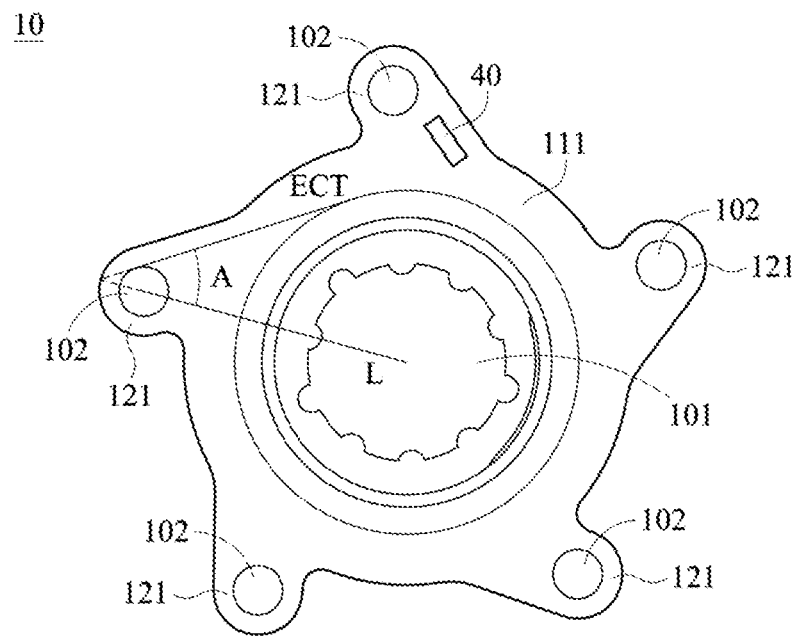
FIG. 3A depicts another view of the spider in FIG. 2.
Figure 3B:
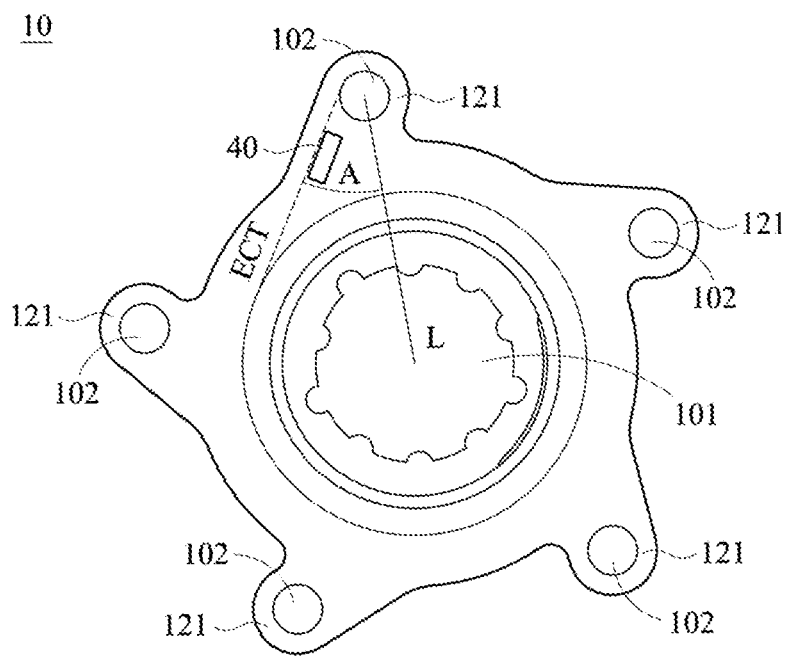
FIG. 3B depicts a variation on the spider of FIG. 3A.

Now refer to FIGS. 1, 2, 3A and 3B. FIG. 1 depicts a bicycle (1) capable of measuring power generated from a cyclist according to one embodiment of the present invention, FIG. 2 depicts an enlarged view of the assembly particularly including a spider (10) partially enlarged from the bicycle (1) of FIG. 1, FIG. 3A depicts another view of the spider (10) in FIG. 2, and FIG. 3B depicts a variation on the spider of FIG. 3A. The bicycle (1) is equipped with two pedals (50-1, 50-2) and two crank arms (20-1, 20-2). The pedals (50-1, 50-2) are respectively mounted to one ends of the corresponding crank arms (20-1, 20-2), and both of them are mounted to a crank axle (20-3) at the other ends. When a cyclist rides on the bicycle (1), the two pedals (50-1, 50-2) are applied by foot force during a reciprocating motion of the cyclist's legs. The force is applied to one end of each crank arms (20-1, 20-2) and generates torque to the other end of each crank arms (20-1, 20-2) which is connected to the crank axle (20-3). The two crank arms (20-1, 20-2) and the crank axle (20-3) are collectively called as a crank assembly (20).

The spider (10) includes a torque input section (101) and five torque output sections (102) as shown in FIG. 2. The crank assembly (20) is coupled with the spider (10) through the torque input section (101), and two chainrings (30-1, 30-2) are mounted to the spider (10) through the torque output sections (102) by any fastening means. From the perspective of the spider (10), the spider (10) receives the torque from the crank assembly (20) through the torque input section (101) and transmits the torque to one of the chainrings (30-1, 30-2) through the torque output sections (102). The chosen one of the chainrings (30-1, 30-2) transmit the torque from the torque output sections (102) to the chain for overcoming or exceeding the opposing force of friction from the bicycle tires and the air resistance (not shown in FIG. 2).

Even though the two chainrings (30-1, 30-2) are illustrated in FIG. 2 in accordance with the present embodiment of the present invention, a person having ordinary skill in the art may understand that the number of chainrings may be varied based on different demands from consumers or manufacturers.

Referring to FIG. 3A, the spider (10) has five arm portions (112) and a central portion (111). The torque input section (101) is located at the central portion (111) and the five torque output sections (102) are located at the five arm portions (112). As shown in FIG. 3A, each arm portion (112) is asymmetric with respect to a line (L) from a center of the torque input section (101) to a center of the corresponding torque output section (102). As shown in FIG. 3A as well, the five arm portions (112) do not radially extend from the central portion (111). More specifically, the arm portions (112) are counterclockwise obliquely extending from the central portion (111) in the front view of the spider (10). The arm portions (112) are defined as an external common tangent (ECT) to the torque input section (101) and any torque output section (102) forms an angle (A) with the line (L) from a center of the torque input section (101) to a center of the corresponding torque output section (102) and the angle (A) ranges from 3 to 75, preferably 30 to 45, degrees.

It should be noted that the present application is not limited to the embodiment in FIG. 2. A person having ordinary skill in the art may understand that any number of torque output section (102) and arm portion (112) may be varied based on different demands from consumers or manufacturers.

It should be noted that though the arm portions (112) are counterclockwise obliquely extending from the central portion (111) in the front view of the spider (10) in accordance with the present embodiment of the present invention, but a person having ordinary skill in the art may understand that the arm portions (112) may be designed to be clockwise obliquely extending from the central portion (111) in the front view of the spider (10), as illustrated in FIG. 3B.

As is illustrated in FIG. 3A or 3B, a gauge (40) is disposed and oriented generally along a tangential direction or a quasi-tangential direction with respect to the torque input section (101) and the at least one torque output section (102). The gauge (40), as an illustrative example, is a strain gauge. The strain gauge is a kind of sensor typically consisting of an insulating flexible base and a metallic foil pattern whose electrical resistance changes with applied force. The strain gauge is then attached to an object by any suitable adhesive. When force is applied to the object and causes deformation of the object, the metallic foil changes its electrical resistance with the deformation. The change in the electrical resistance is measured typically by a Wheatstone bridge. By the way, when the force is applied to an object, stress and strain occur. Stress is defined as an internal force of the object, and strain is defined as the internal deformation of the object occurs.

Upon the torque being applied to the spider (10), the gauge (40) is capable of measuring deformation of the spider (10) and generates an electronic signal in response to strength of the torque. In the case of FIG. 3A that the arm portions (112) are counterclockwise obliquely extending from the central portion (111) in the front view of the spider (10), pure tensile stress generated by the torque occurs on where the gauge (40) is disposed. On the contrary, in the case that the arm portions (112) are clockwise obliquely extending from the central portion (111) in the front view of the spider (10) as shown in FIG. 3B, pure compressive stress generated by the torque occurs on where the gauge (40) is disposed. The electronic signal generated by the gauge (40) contains information representative of the strength of the pure tensile or compressive stress. The electronic signal is then transmitted to a circuitry (not shown in FIG. 3A or 3B) coupled to the gauge (40).

It should be noted that though the gauge (40) is disposed on a front face of the spider (10) in accordance with the present embodiment of the present invention, a person having ordinary skill in the art may understand that the gauge (40) or plural gauges may be disposed on a back face or a side face of the spider (10).

By disposing and orienting the gauge (40) generally along a tangential direction or a quasi-tangential direction with respect to the torque input section (101) and the at least one torque output section (102), the torque, or pedaling power during a period of time, may be easily derived in accordance with the present embodiment of the present invention.

Figure 4:
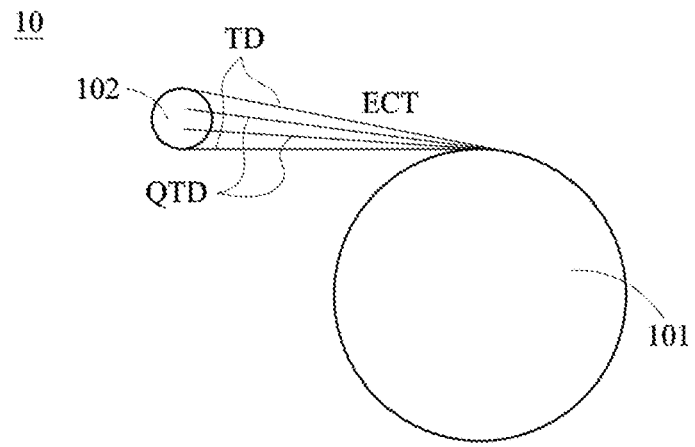
FIG. 4 depicts an external common tangent and an internal common tangent to the torque input section and torque output section of the spider in FIG. 3A.

FIG. 4 depicts an external common tangent (ECT) and an internal common tangent (ICT) to the torque input section (101) and torque output section (102) of the spider (10) in FIG. 3A. The tangential direction (TD) may be more specifically defined as a direction along an external common tangent (ECT) or an internal common tangent (ICT) to the torque input section (101) and the at least one torque output section (102). The quasi-tangential direction (QTD) may be more specifically defined as a direction along a line whose slope is between slopes of the external common tangent (ECT) and the internal common tangent (ICT) in accordance with another embodiment of the present invention. By disposing and orienting the gauge (40) generally along the tangential direction (TD) or the quasi-tangential direction (QTD) depicted in FIG. 4, the torque, or pedaling power during a period of time, may be simply, precisely and accurately measured.

Figure 5A:
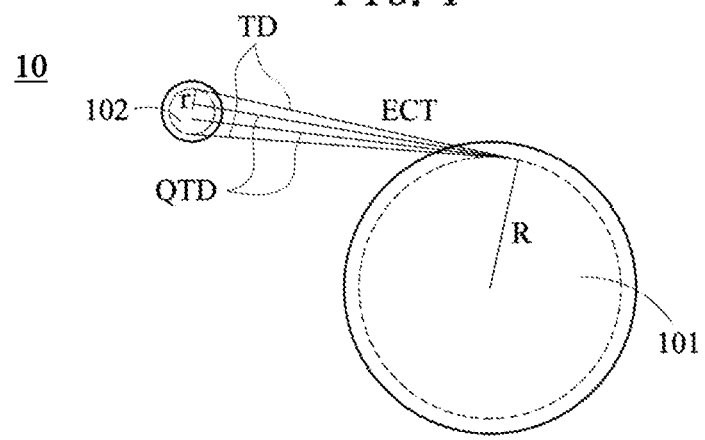
FIGS. 5A-5B depict various external common tangents and internal common tangents to the torque input section and torque output section in FIG. 3A.
Figure 5B:
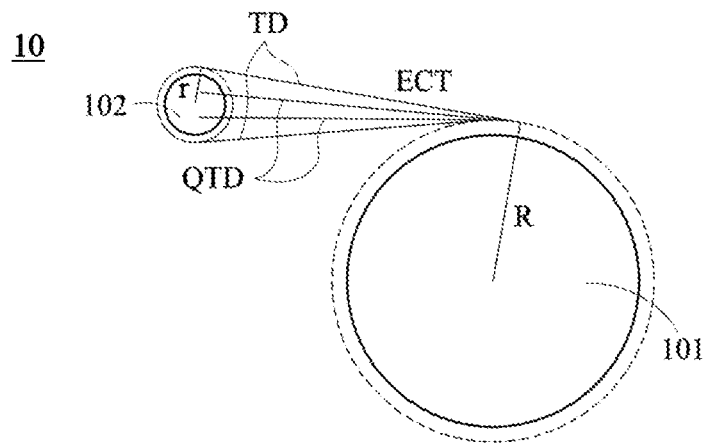

FIGS. 5A and 5B both show various external common tangents (ECT) and internal common tangents (ICT) to the torque input section (101) and torque output section (102) in FIG. 3A. The tangential direction (TD) may also be more specifically defined as a direction along an external common tangent (ECT) and an internal common tangent (ICT) to a circle with a radius (R) of 10 to 100, preferably 30 to 45, millimeters from a center of the torque input section (101) and a circle with a radius (r) of 4 to 6, preferably 5, millimeters from a center of the at least one torque output section (102). The quasi-tangential direction (QTD) may also be more specifically defined as a direction along a line whose slope is between slopes of the external common tangent (ECT) and the internal common tangent (ICT). For illustrative purpose, FIG. 5A depicts that the radius R is 30 millimeters and the radius r is 5 millimeters and FIG. 5B depicts that radius R is 50 millimeters and radius r is 6 millimeters in accordance with yet another embodiment of the present invention. By disposing and orienting the gauge (40) generally along the tangential direction (TD) or the quasi-tangential direction (QTD) depicted in FIGS. 5A or 5B, the torque, or pedaling power during a period of time, may be simply, precisely and accurately measured.

It should be noted that x and y axes are not indicated in FIGS. 4, 5A and 5B because the spider (10) is rotatable. However, the slopes of the tangential direction (TD) and the quasi-tangential direction (QTD) can be understood as steepness of lines in relative terms.

Figure 6A:
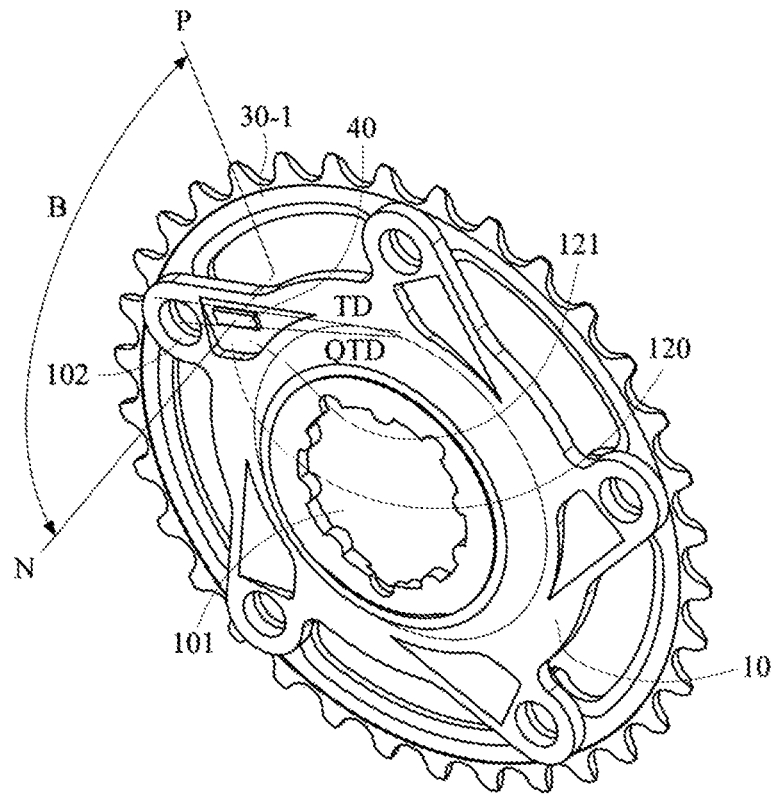
FIG. 6A depicts a view of a spider with a concave in accordance with yet another embodiment of the present invention.
Figure 6B:
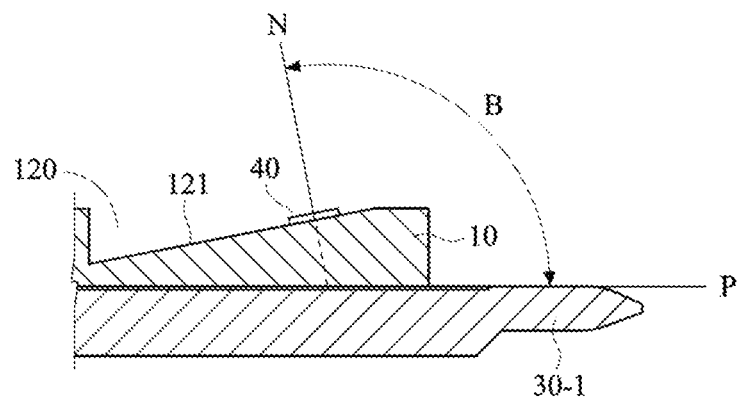
FIG. 6B depicts a cross-sectional view of the concave in accordance with the spider of FIG. 6A.
Figure 10A:
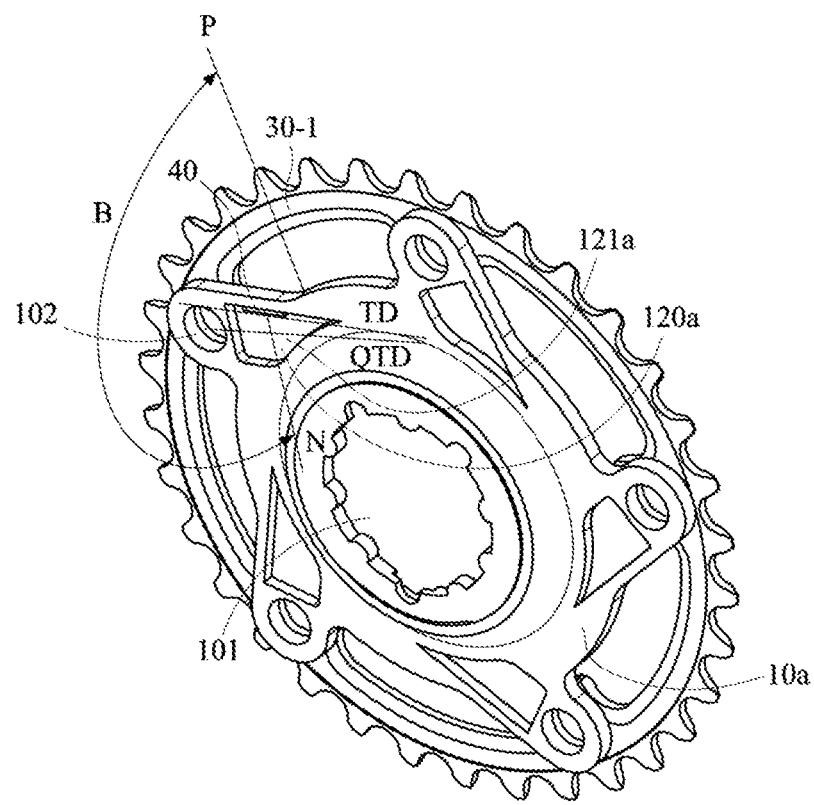
FIG. 10A depicts a view of a spider with a concave in accordance with yet another embodiment of the present invention.
Figure 10B:
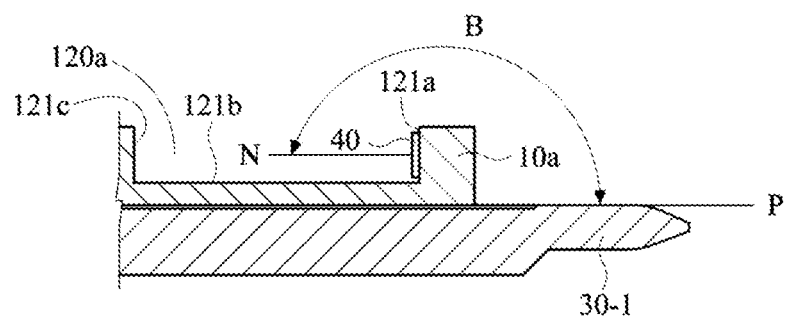
FIG. 10B depicts a cross-sectional view of the concave in accordance with the spider of FIG. 10A.

Now refer to FIG. 6A depicting a front view of the spider (10) with at least one concave (120) in accordance with yet another embodiment of the present invention. The at least one concave (120) of the spider (10) has an inclined flat surface (121). The gauge (40) is attached on the inclined flat surface (121) of the at least one concave and aligned with the tangential direction (TD) or the quasi-tangential direction (QTD) with respect to the torque input section (101) and the corresponding torque output section (102). FIG. 6B depicts a cross-sectional view of the concave in accordance with the spider of FIG. 6A. The inclined flat surface (121) has an inclined angle with the main plane of the central portion (111). Compared with the present embodiment, FIGS. 10A-10B illustrate that a spider (10a) has at least one concave (120a) with two side flat surfaces (121a and 121c) and a bottom flat surface (121b), and the side flat surfaces (121a and 121c) is perpendicular to a main plane of the central portion (111), and the bottom flat surface (121b) is parallel to the main plane of the central portion (111).

Figure 7A:
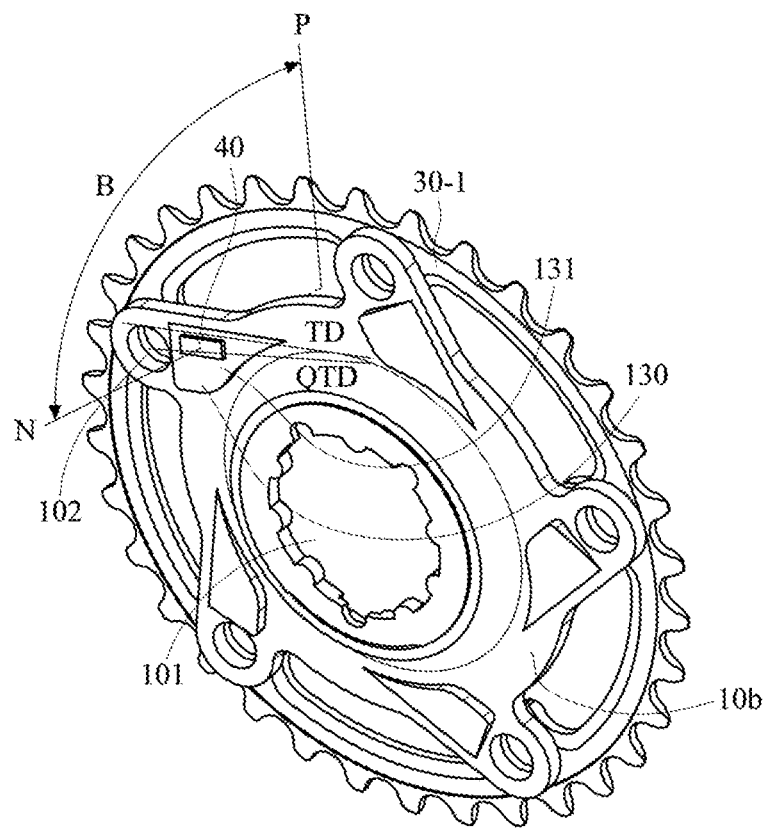
FIG. 7A depicts a view of a spider with a convex in accordance with yet another embodiment of the present invention.
Figure 7B:
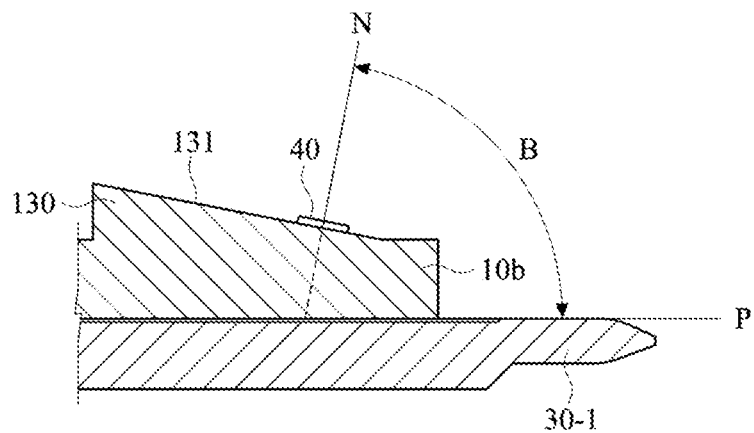
FIG. 7B depicts a cross-sectional view of the convex in accordance with the spider of FIG. 7A.
Figure 8A:
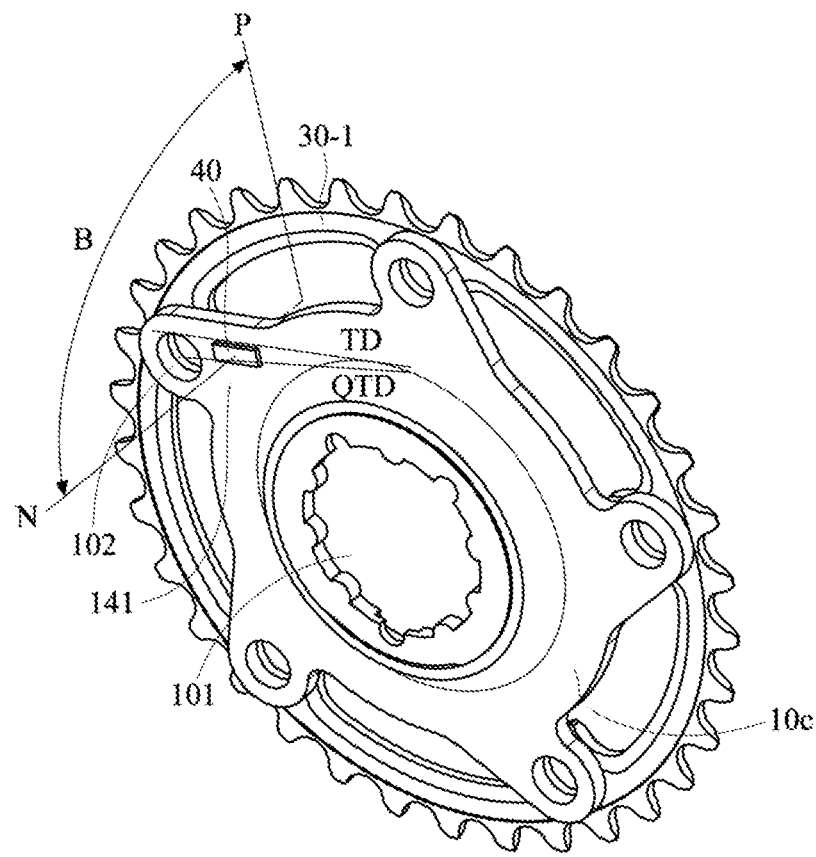
FIG. 8A depicts a view of a spider with a flat surface in accordance with yet another embodiment of the present invention.
Figure 8B:
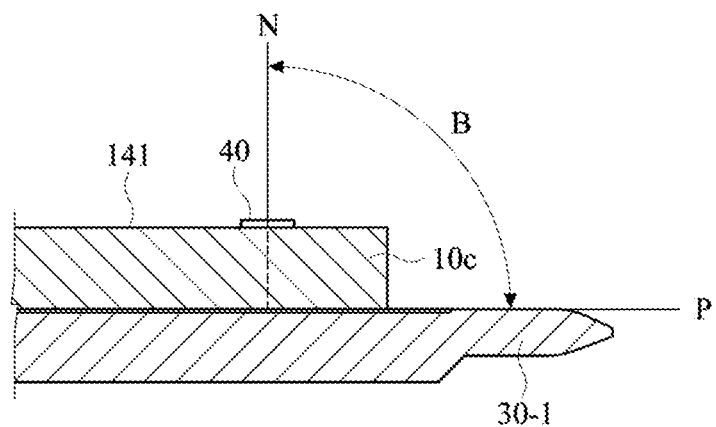
FIG. 8B depicts a cross-sectional view of the flat surface in accordance with the spider of FIG. 8A.
Figure 9A:
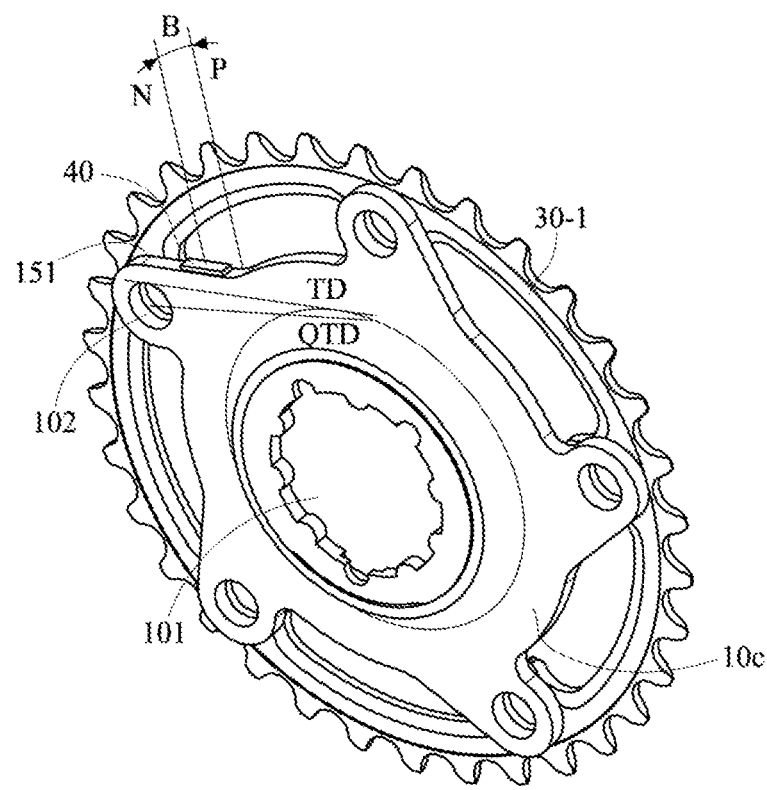
FIG. 9A depicts a view of a spider with a flat surface in accordance with yet another embodiment of the present invention.
Figure 9B:
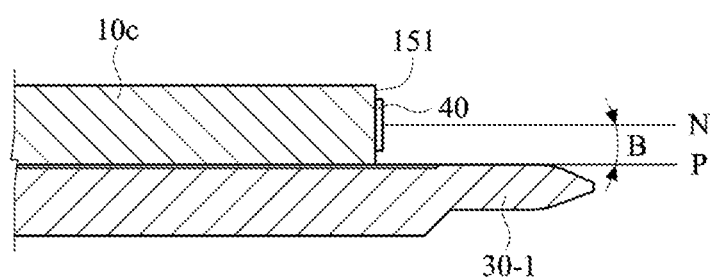
FIG. 9B depicts an enlarged view of the flat surface in accordance with the spider of FIG. 9A.

It should be noted that though the gauge (40) is attached on the inclined flat surface (121) or the side flat surface (121a) of the at least one concave in accordance with the embodiments of the present invention shown in FIGS. 6A-6B and 10A-10B, a person having ordinary skill in the art may not only understand that the gauge (40) may be attached on the side flat surface (121c) or the bottom flat surface (121b) but also understand that the spider may be designed as to have at least one convex (130) with an inclined flat surface (131) or a side flat surface (not shown) to which the gauge (40) is attached, such as a spider (10b) shown in FIGS. 7A and 7B. Moreover, the gauge (40) may also be attached to anywhere of the spider as long as a flat surface could be found, such as a flat surface (141) could be found from a front face of a spider (10c) as shown in FIGS. 8A and 8B and another flat surface (151) could be found from a side face of the spider (10c) as shown in FIGS. 9A and 9B. In short summary, the flat surface (121, 121a, 121b, 121c, 131, 141 and 151) of the spider (10, 10a, 10b and 10c) or the attached area in accordance of these embodiments is broadly defined in a manner that a normal line (N) of the flat surface (121, 121a, 121b, 121c, 131, 141 and 151) or the attached area forms an angle (B) with a plane of any chainring (illustrated by numeral reference 30-1 only) which is parallel to a main plane of the spider (10, 10a, 10b and 10c) and the angle (B) ranges from 0 to 180 degrees. A line (P) depicted in FIGS. 6A-10B lies on the plane of the chainring (30-1) and is used to illustrate where the plane of the charning (30-1) is.

For these exemplary embodiments, in FIGS. 9A-9B, the gauge (40) is directly attached on the side face of the spider (10c) so that the angle (B) is 0 degree. In FIGS. 7A-7B, the gauge (40) is attached on the inclined flat surface (131) of the convex (130) of the spider (10b), and the angle (B) ranges from 0 to 90 degrees. In FIGS. 8A-8B, the angle (B) is 90 degrees when the gauge (40) is directly attached on the front or back face of the spider (10c). In FIGS. 6A-6B and 10A-10B, the gauge (40) is attached on the inclined flat surface (121) or the side flat surface (121a) of the concave (120, 120a) of the spider (10, 10a), the angle (B) ranges from 90 to 180 degrees.

The preferred embodiments of the present invention have been described above. However, those having ordinary skill in the art readily recognize that the disclosure described above can be utilized in a variety of devices, environments, and situations. Although the present invention is written with respect to specific embodiments and implementations, various changes and modifications may be suggested to a person having ordinary skill in the art. It is intended that the present disclosure encompass such changes and modifications that fall within the scope of the appended claims.

What is claimed is:

1. A bicycle, comprising:
   a spider including a torque input section and at least one torque output section;
   a crank assembly coupled with the spider through the torque input section and applying an input torque to the spider;
   a chainring mounted to the spider through the at least one torque output section and receiving an output torque from the spider;
   a gauge disposed and oriented generally along a tangential direction or a quasi-tangential direction with respect to the torque input section and the at least one torque output section; and
   a circuitry coupled to the gauge and receiving a signal from the gauge;
   wherein the spider has at least one arm portion and a central portion, and the at least one arm portion does not radially extend from the central portion.

2. The bicycle of claim 1, wherein the tangential direction is defined as a direction along an external common tangent or an internal common tangent to the torque input section and the at least one torque output section, and the quasi-tangential direction is defined as a direction along a line whose slope is between slopes of the external common tangent and the internal common tangent.

3. The bicycle of claim 1, wherein the tangential direction is defined as a direction along an external common tangent and an internal common tangent to a circle with a radius of 10 to 100, preferably 30 to 45, millimeters from a center of the torque input section and a circle with a radius of 4 to 6, preferably 5, millimeters from a center of the at least one torque output section, and the quasi-tangential direction is defined as a direction along a line whose slope is between slopes of the external common tangent and the internal common tangent.

4. The bicycle of claim 1, wherein the spider has at least one arm portion and a central portion, and the torque input section is located at the central portion and the at least one torque output section is located at the at least one arm portion, and wherein the at least one arm portion is asymmetric with respect to a line from a center of the torque input section to a center of the at least one torque output section.

5. The bicycle of claim 1, wherein the at least one arm portion is clockwise or counterclockwise obliquely extending from the central portion.

6. The bicycle of claim 1, wherein an external common tangent to the torque input section and the at least one torque output section forms an angle with a line from a center of the torque input section to a center of the at least one torque output section and the angle ranges from 3 to 75, preferably 30 to 45, degrees.

7. The bicycle of claim 1, wherein the gauge is attached on a flat surface of the spider, and a normal line of the flat surface forms an angle with a plane of the chainring and the angle ranges from 0 to 180 degrees.

8. The bicycle of claim 7, wherein the flat surface of the spider is formed on a convex or concave of the spider and aligned with the tangential direction or the quasi-tangential direction.

9. The bicycle of claim 1, wherein pure tensile or compressive stress occurs on where the gauge is disposed.

10. A spider, comprising:
    a central portion including a torque input section;

at least one arm portion including at least one torque output section and outward extending from the central portion; and a gauge, disposed and oriented generally along a tangential direction or a quasi-tangential direction with respect to the torque input section and the at least one torque output section and generating a signal in response to torque transmission from the torque input section to the at least one torque output section;

wherein the at least one arm portion does not radially extend from the central portion.

11. The spider of claim 10, the tangential direction is defined as a direction along an external common tangent or an internal common tangent to the torque input section and the at least one torque output section, and the quasi-tangential direction is defined as a direction along a line whose slope is between slopes of the external common tangent and the internal common tangent.

12. The spider of claim 10, wherein the tangential direction is defined as a direction along an external common tangent and an internal common tangent to a circle with a radius of 10 to 100, preferably 30 to 45, millimeters from a center of the torque input section and a circle with a radius of 4 to 6, preferably 5, millimeters from a center of the at least one torque output section, and the quasi-tangential direction is defined as a direction along a line whose slope is between slopes of the external common tangent and the internal common tangent.

13. The spider of claim 10, wherein the at least one arm portion is asymmetric with respect to a line from a center of the torque input section to a center of the at least one torque output section.

14. The spider of claim 10, wherein the at least one arm portion is clockwise or counterclockwise obliquely extending from the central portion.

15. The spider of claim 10, wherein an external common tangent to the torque input section and the at least one torque output section forms an angle with a line from a center of the torque input section to a center of the at least one torque output section and the angle ranges from 3 to 75, preferably 30 to 45, degrees.

16. The spider of claim 10, wherein the gauge is attached on a flat surface of the spider, and a normal line of the flat surface forms an angle with a main plane of the spider and the angle ranges from 0 to 180 degrees.

17. The spider of claim 16, wherein the flat surface of the spider is formed on a convex or concave of the spider and aligned with the tangential direction or the quasi-tangential direction.

18. The spider of claim 10, wherein pure tensile or compressive stress occurs on where the gauge is disposed.

* * * * *